United States Patent Office 3,344,162
Patented Sept. 26, 1967

3,344,162
PREPARATION OF AROMATIC POLY-
ISOCYANATES
Richard L. Rowton, Austin, Tex., assignor to Jefferson
Chemical Company, Inc., Houston, Tex., a corporation
of Delaware
No Drawing. Filed Jan. 2, 1964, Ser. No. 335,409
4 Claims. (Cl. 260—453)

This invention relates to a method for the preparation of aromatic polyisocyanates. More particularly, this invention relates to a method for the preparation of polyfunctional methylene, polyisocyanates having superior physical properties.

In co-pending Bentley application Ser. No. 335,396, entitled, "Functional Polyaryl Compounds and the Preparation and Utilization Thereof," filed of an even date herewith, there is disclosed a method for the preparation of polyphenylene methylene amines by the reaction of aniline with formaldehyde over a solid acidic siliceous catalyst to provide a reaction mixture comprising amines of the formula:

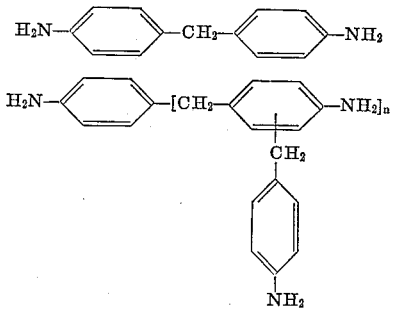

wherein $n$ is an integer having a value of 1 to 3 and normally has an average value of about 1. Moreover, as is pointed out in the said co-pending Bentley application, the crude reaction mixture is characterized by a comparatively high concentration of diaminodiphenylmethanes in both the 4,4'- and 2,4'-isomers formed, but wherein the 2,4'-isomer is present in an appreciable amount within the range of from about 10 to 95 wt. percent. The structural formulae of the two isomers may be represented as follows:

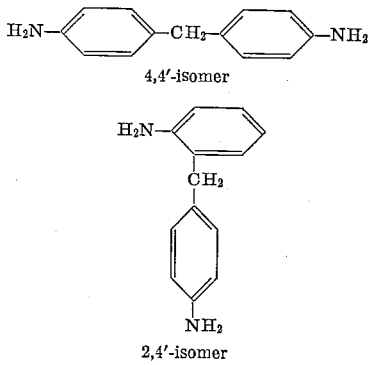

Reaction mixtures prepared by the said method will contain a mixture of dimer isomers and higher polymers thereof of the formulae given above and have a dimer content within the range from about 50 to about 95 wt. percent, of which from about 10 to about 95 wt. percent will be the 2,4'-isomer.

A preferred reaction mixture will contain about 40 to 85 wt. percent of the dimer mixture and 30 to 95 wt. percent of the dimer will be the 2,4'-isomer. Correspondingly, 70 to 50 wt. percent of the dimer mixture will be the 4,4'-isomer and the higher polymers will constitute 60 to 15 wt. percent of the mixture.

Although polyisocyanates may be prepared from this crude reaction mixture by conventional techniques, the results leave much to be desired, particularly with reference to isocyanato group content (which tends to be low) and hydrolyzable chlorine (which tends to be high), which are experienced due to incomplete conversion of the amino groups to isocyanato groups. The low isocyanato group content is undesirable, not only because of the adverse effect on economics, but also because the viscosity of the product bears an inverse relationship to the isocyanato group content. Excessively viscid mixtures are difficult to work with and thus further detract from the utility of the product.

In accordance with the present invention, the foregoing and other difficulties are overcome by a method wherein a mixture of poly(aminophenylene) methanes of the above-described composition is dissolved in a chlorinated aromatic hydrocarbon solvent and wherein the said solution is added at a temperature within the range from about 25° to about 50° C. to a chlorinated aromatic hydrocarbon solution of phosgene containing from about 4 to 5 mol equivalents of phosgene per mole equivalent of amine group in the said amine feed stock. It is necessary that the total amount of solvent employed in both solutions be sufficient to provide a final mixture of the two solutions which contains from about 6 to 9 wt. percent of the polyamines. After the addition is complete, it is also necessary to heat the resultant slurry. The heat-reaction step may be conducted at atmospheric or superatmospheric pressure which is sufficient to maintain the solvent in liquid phase at the reaction temperature employed. The temperature is suitably within the range from about 75° to 150° C. (depending on the pressure and the boiling point of the solvent), and is preferably conducted at atmospheric pressure at about 100° to about 120° C. An additional 1 to 3 mol equivalents of phosgene is added at the higher temperature. As a consequence, a suspension of carbamoyl chlorides in the solvent will be formed which will progressively decompose in the presence of the phosgene to provide a polyisocyanate reaction product. The slurry is then held within the indicated temperature range until the said carbamoyl chlorides have decomposed, as evidenced by the formation of a clear solvent solution of the polyisocyanate reaction product. Thereafter, the reaction is terminated and the chlorinated aromatic hydrocarbon is removed in any suitable manner such as flash distillation or vacuum distillation. The resultant polyisocyanate mixture may be utilized in its crude form for the preparation of polyurethanes without additional purification steps and may be characterized as a low viscosity mixture having a very high isocyanate content (up to 94% of theoretical) and a low hydrolyzable chloride content (from about 0.2% to about 0.5%).

The invention will be further illustrated with reference to the following specific examples, which are given by way of illustration and not as limitation on the scope of this invention.

*Example 1*

The polyamine phosgenated in this example was prepared by the condensation of aniline and formaldehyde at a molar ratio of 6:1 and at 130° over Superfiltrol activated clay. The product contained 89% diamine of which 47% was the 2,4'-isomer.

A solution of 200 g. of the above polyamine in 1,200 g. of monochlorobenzene was run into a solution of 350 g. of phosgene dissolved in 1,900 g. of monochlorobenzene while maintaining the temperature at 25°–30° C.

The resulting slurry was heated to 110° while passing a slow stream of phosgene through the reaction mixture. When there was no longer any solid material in the flask, the reaction was halted. A total of 650 g. of phosgene had been employed. Excess phosgene was removed with a stream of dry nitrogen and solvent was removed by flash evaporating.

The residue weighed 248 g. and was a dark, fairly fluid liquid.

—NCO content, 7.58 milliequivalents/g. (theory, 8.0). Hydrolyzable chlorine, 0.28% by weight.

The improved viscosity of this polyisocyanate over those presently available commercially is indicated in the table below.

| Isocyanate | Viscosity, 24° C., cps. |
|---|---|
| This example | 35 |
| A | 150 |
| B | 300 |

A = Commercial crude 4,4'-methylene-bis(phenylisocyanate).
B = Commercial crude polymethylenepolyphenylisocyanate.

Example II

A crude diisocyanate was prepared as described in Example I from a distilled diamine containing approximately 50% of the 2,4'-isomer of diaminodiphenylmethane. Four hundred grams of the crude diisocyanate were flash distilled at <1 mm. Hg. The volatile distillate weighed 315 g. and was a light yellow, low viscosity liquid which remained liquid at room temperature. The following physical properties were observed:

—NCO content, 7.98 milliequivalents/g. (theory, 8.0). $n$ 25/D, 1.6011; $d$ 20/20, 1.2061; hydrolyzable chlorine, 0.06%.

An infrared spectrum showed the absence of any contaminating-carbonyl containing compounds and the high ortho substitution by a strong absorption band at 755 cm.$^{-1}$.

Example III

This example is representative of the prior art method for the preparation of polyisocyanates.

The polyamine to be phosgenated was an aniline-formaldehyde condensation product with an average molecular weight of 276 (osmometric) and containing 59% diamine. The diamine fraction contained 25% of the 2,4'-isomer of diaminodiphenylmethane. The equivalent weight of the polyamine was 103.6.

A solution of 234 g. of the above polyamine in 470 g. of o-dichlorobenzene was run into a solution of 170 g. of phosgene in 1,000 g. of o-dichlorobenzene while maintaining the temperature of 25°–30° C. The resulting slurry was heated rapidly to 160° while passing a stream of phosgene through the reaction mixture at the rate of about 4 g./min.

When all solid matter had disappeared from the reaction flask, excess phosgene was removed by passing in a stream of dry nitrogen. The solvent was removed by vacuum stripping, yielding 295 g. of a dark, viscous product.

—NCO content, 6.95 milliequivalents/g.

Having thus described my invention, what is claimed is:

1. In a method for the preparation of a polyisocyanate reaction product from a mixture of aromatic amines, the improvement which comprises the steps of adding a chlorinated aromatic hydrocarbon solvent solution of said aromatic amine mixture to a chlorinated aromatic hydrocarbon solvent solution of phosgene at a temperature within the range of from about 25° to about 50° C. in an amount sufficient to provide from about 4 to 5 mol equivalents of phosgene in the mixture, based on said aromatic amine, and a total amount of solvent sufficient to provide about a 6 to 9 wt. percent solution of said aromatic amine; thereafter heating the resultant slurry in liquid phase at a temperature within the range of from about 75° to about 150° C. while adding an additional 1 to 3 mol equivalents of phosgene, based on the said aromatic amine and thereafter heating said mixture within said temperature range for a period of time sufficient to provide a clear solution and thereafter terminating the reaction and removing the solvent from the reaction mixture to thereby provide said polyisocyanate composition, said aromatic amines having the formulae:

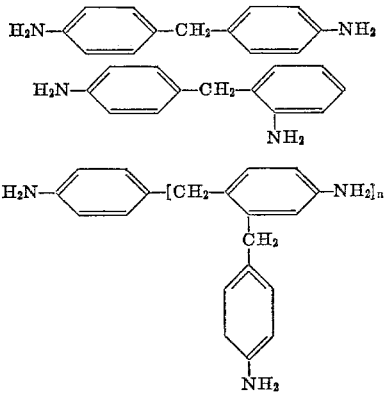

wherein $n$ is an integer having a value of 1 to 3, said mixture of amines containing from about 50 to about 90 wt. percent of the dimers; from about 10 to 95 wt. percent of the dimers being the 2,4'-isomer.

2. A method as in claim 1 wherein the said slurry is heated at a temperature within the range of about 100° to about 120° C. and wherein the mixture of aromatic amines contains from about 40 to about 85 wt. percent of said dimers; from about 30 to 95 wt. percent of said dimers being the 2,4'-isomer.

3. In a method for the preparation of a polyisocyanate reaction product from a mixture of aromatic amines, the improvement which comprises the steps of adding a chlorinated aromatic hydrocarbon solvent solution of said aromatic amine mixture to a chlorinated aromatic hydrocarbon solvent solution of phosgene at a temperature within the range of from about 25° to about 50° C. in an amount sufficient to provide from about 4 to 5 mol equivalents of phosgene in the mixture, based on said aromatic amine, and a total amount of solvent sufficient to provide about a 6 to 9 wt. percent solution of said aromatic amine; thereafter heating the resultant slurry in liquid phase at a temperature within the range of from about 75° to about 150° C. while adding an additional 1 to 3 mol equivalents of phosgene, based on the said aromatic amine and thereafter heating said mixture within said temperature range for a period of time sufficient to provide a clear solution and thereafter terminating the reaction and removing the solvent from the reaction mixture to thereby provide said polyisocyanate composition, said aromatic amines having the formulae:

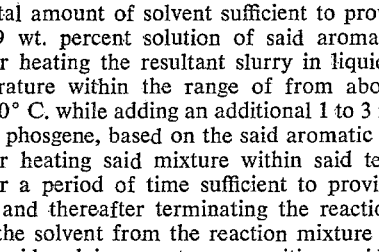
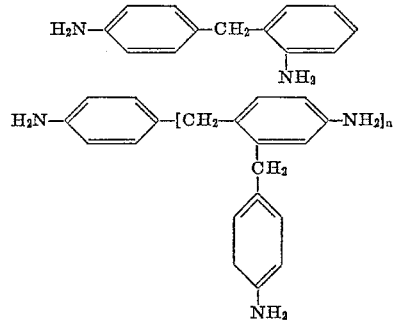

wherein $n$ is an integer having a value of 1 to 3, said mixture of amines containing from about 50 to about 90 wt. percent of the dimers; from about 10 to 95 wt. percent of the dimers being the 2,4′-isomer; said chlorinated aromatic hydrocarbon solvent selected from the group consisting of monochlorobenzene and orthodichlorobenzene.

4. A method as in claim 3 wherein the said slurry is heated at a temperature within the range of about 100° to about 120° C. and wherein the mixture of aromatic amines contains from about 40 to about 85 wt. percent of said dimers; from about 30 to 95 wt. percent of said dimers being the 2,4′-isomer.

No references cited.

CHARLES B. PARKER, *Primary Examiner.*

DOLPH H. TORRENCE, *Assistant Examiner.*